Nov. 26, 1929.　　　O. JANSSEN　　　1,736,789
TRANSMISSION
Filed March 14, 1928　　2 Sheets-Sheet 1

Oscar Janssen, Inventor.
Delos G. Haynes, Attorney.

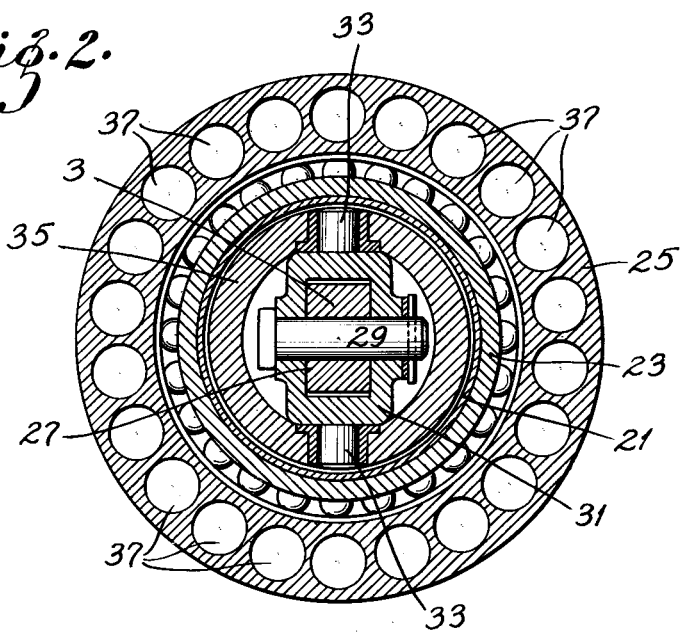
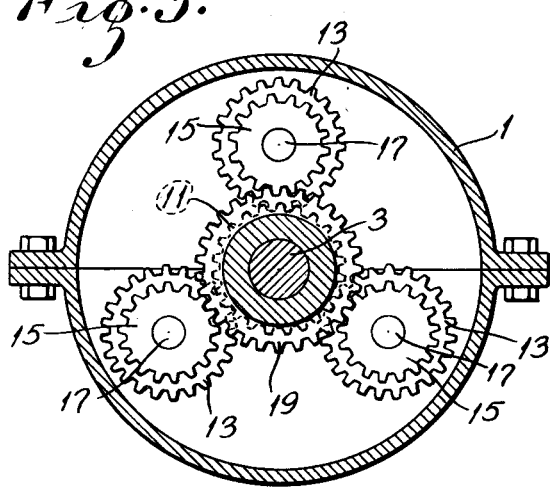

Patented Nov. 26, 1929

1,736,789

UNITED STATES PATENT OFFICE

OSCAR JANSSEN, OF ST. LOUIS, MISSOURI

TRANSMISSION

Application filed March 14, 1928. Serial No. 261,475.

This invention relates to power transmissions and with regard to certain more specific features, to a power transmission preferably, though not necessarily, for automotive vehicles, in which a fluid is used advantageously as an inertia medium.

Among the several objects of the invention may be noted the provision of a transmission which is adapted to automatically effect a smooth delivery of power from a power source to a point of use, in such a manner that a continuously varying mechanical advantage is automatically effected, whereby a prime mover of the type having high torque at higher speeds only is caused to operate at maximum effectiveness throughout an entire vehicle acceleration period; the provision of a device of the class described in which gear teeth need not be moved into and out of engagement and in which overrunning clutches and the like are eliminated; the provision of a device of the class described which does not depend upon friction as a transmitting medium and the provision of a device of the class described which is simple and economical in construction, maintenance and operation. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings, in which is illustrated one of various possible embodiments of the invention, Fig. 1 is a longitudinal section, illustrating certain fundamental elements of the invention;

Fig. 2 is a cross section taken on line 2—2 of Fig. 1; and

Fig. 3 is a cross section taken on line 3—3 of Fig. 1.

Similar reference characters indicate corresponding parts throughout the several views of the drawings.

Figure 1:
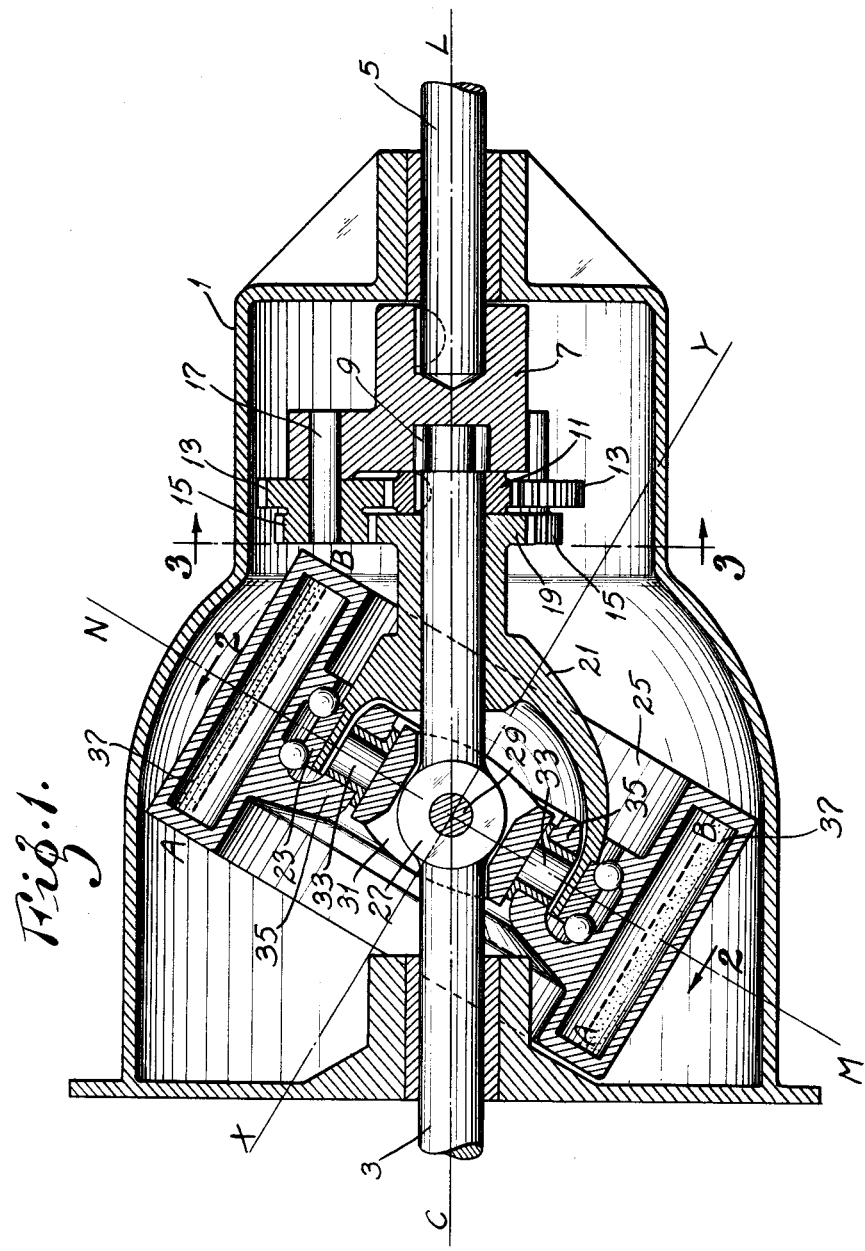

Referring now more particularly to Fig. 1 there is illustrated at numeral 1 a suitable housing into which leads a drive shaft 3 and out of which leads a driven shaft 5. The drive shaft 3 is connected externally of the housing 1 to a suitable engine or prime mover or the like, such as an internal combustion engine.

This invention is especially adapted for use with prime movers or engines having a limited effective torque range as plotted against speed. The internal combustion engine is merely a class example of the type of prime mover referred to and others might be mentioned, such as steam and gas turbines. These machines as a class require the means for effecting change of mechanical advantage, in order to make the limited troque-speed range of the engine effective to match or balance the unlimited torque-speed range had at the driven member.

In the present example the driven shaft 5 is in mechanical connection with the well known driving system of a motor car (not shown).

As illustrated in Fig. 1 the drive shaft 3 is piloted in an arm piece 7 which is made fast to the driven shaft 5. A suitable bearing 9 permitting free relative movement is used at the pilot.

Keyed to the drive shaft 3 is a driving sun gear 11 which meshes with a plurality of planet gears 13, the latter being nested integrally with secondary planet gears 15. Each integral nest 13, 15 is rotatably carried on a stud 17 extending from said arm piece 7, the latter hereinafter to be called the epicyclic arm. Three nests of gears 13, 15 and three studs 17 are shown in the present embodiment, but it is to be understood that any suitable number may be used.

The secondary planet gears 15 mesh with a driven sun gear 19 formed integrally with an intermediate member or oscillator 21. The oscillator 21 is freely rotatable on the drive shaft 3 and is preferably composed of bronze or like material for reducing wear.

It may be noted that the sets of gears 11, 13, 15, 19 and the arm piece 7 comprise an epicyclic gear train when said arm piece 7 is in motion; otherwise said gears 11, 13, 15 and 19 comprise an ordinary straight gear train, that is, when the piece 7 is not in motion. Both epicyclic and straight train action is had whenever there is any relative movement between the drive shaft 3 and the driven shaft 5, even though the driven shaft 5 be moving.

As a result of the above, whenever there is relative movement between the drive shaft 3 and the driven shaft 5, there is a driving action through the gear train 11, 13, 15, 19, causing relative rotation between the oscillator 21 and the drive shaft 3.

The oscillator 21 carries a bearing race 23 and suitable bearings therefor, so formed that the rotation of an external inertia chamber 25 is forced to take place, thereon and only in a plane which is always at an angle to the main center line CL of the apparatus. In other words, the rotating inertia chamber 25 is forced to rotate on an axis XY which assumes a conoidal motion, due to the rotation of the oscillator 21.

Rotation of the inertia chamber 25 on the oscillator 21 is effected by means of a universal coupling between it and the drive shaft 3. This coupling comprises a knuckle 27 formed integrally with the drive shaft 3 and carrying a cross or gudgeon pin 29 which engages with a gimbal 31. The gimbal 31 carries sideward gudgeons 33 which extend into and cause driving of the inertia chamber 25. It will be noted from the drawings that the inertia chamber 25 carries a suitable extension 35 which reaches inwardly to engage said gudgeons 33.

What I believe to be one of the outstanding characteristics of my invention is the fact that the inertia chamber 25 carries a free mass as the inertia mass of my transmission. This free mass in the present embodiment comprises a liquid, preferably a heavy liquid, such as mercury, or mercury alloyed with lead in such proportion that fluidity is maintained. An advantage of the mercury, beside its heaviness is its non-freezing characteristics at ordinary temperatures. Other suitable liquids may also be used. Or a free mass may be used comprising a plurality of small non-liquid bodies, such as shot.

Examination of Fig. 2 reveals that the inertia chamber 25 is provided with a series of chambers 37 formed with their long dimensions preferably parallel to the conoidal axis XY. Each chamber is substantially half full of the free or flexible mass above described.

The fractional fullness of each chamber is of no particular moment, so far as principles of operation are concerned. In fact, each chamber might carry a separate solid ball of diameter slightly less than the bore of the chamber, provided proper means is employed to eliminate noisy action, such as buffer springs. The chambers are preferably not completely full.

The theory of operation of this device appears to be as follows:

Assuming the driven shaft 5 to be loaded and stationary, and the prime mover moving and driving the drive shaft 3, the first action will be a rotation of the inertia chamber 25 on the oscillator 21, while at the same time the oscillator 21 is driven to rotate on the shaft 3 through the train of gears 11, 13, 15 and 19, these gears functioning as a straight train with the pins 17 stationary.

It will be seen that if the oscillator 21 were not rotating, that the inertia chamber 25 would rotate steadily on a stationary axis XY, thereby throwing the liquid centrifugally out to a position longitudinally against the outer walls of the chamber 37, taking up the heavy dotted line positions AB, for instance.

According to the laws of inertia and gyroscopy, any tendency to throw a mass out of a given plane of rotation by a secondary rotation around a secondary axis, results in a precessional movement of the mass around an axis, known as the axis of precession, positioned at right angles to said secondary axis.

If precession is resisted, no gyroscopic resistance will react against the tendency to throw the mass out of said given plane, but only the ordinary inertial resistance, which is a small fraction of the gyroscopic resistance.

If precession is not resisted, the large gyroscopic resistance will react against the tendency to throw the mass out of said given plane, as well as said small ordinary inertial resistance.

Applying this theory to the action of the present device, it will be seen that the action of the oscillator 21 at any instant is to move the axis XY conoidally, that is, in moving the plane of rotation MN to apply torque around some axis. This results in a tendency for the chamber 25 and its contents to precess at right angles. In regard to the chamber member itself, taken as a solid, non-free mass, this precession is resisted by the bearing at 23 and hence this non-free mass provides no gyroscopic resistance to the turning of the oscillator 21. It provides only a direct inertial resistance, which is small.

On the other hand the free mass of liquid or other substance is free to precess and therefore to set up a gyroscopic resistance against the applied couple, due to the action of the oscillator 21.

As long as the applied couple of the oscillator 21 is substantially not resisted, the gear train acts as a straight train and there is little or no tendency to pick up the load by moving the driven shaft 5.

However, when the applied couple of the oscillator 21 is substantially resisted, as by the reacting couple due to the dynamic action of the free mass described above, then there is a tendency for the planet wheels 15 to move around on the planet wheel 19, thereby carrying around the pins 17 and driving the driven shaft 5.

All that is necessary to pick up the load is to accelerate the prime mover or engine on the shaft 3 by opening its throttle or otherwise. As long as the load on the shaft 5 above what the engine can supply and is not picked up, the engine may continue to accelerate, that is, it needs not provide high-torque at low speed. As its speed increases the inertial reactions involved increase and the load is gradually picked up.

In the above, the theory of operation is advanced only to provide means of description. I do not assert that there may not be other more concise and/or more correct theories, such as one which might include the cross thrust due to sloshing action of the fluid back and forth in the chamber as the oscillator effects the operation, for it appears that the cross thrusts of the sloshing liquid taking place across the plane NM perform a driving action.

Another explanation of the action of this device may be that the rotation about axis CL is combined with the rotation about axis XY the result of which is a tendency to force the liquid into the outermost ends of the chambers 37.

The liquid then tends to maintain this position, spinning about axis CL, but the relative position of each chamber 37 with respect to axis CL is changing because of rotation about axis XY, that is, an end which at one period is a maximum distance from axis CL will at a later period be at a minimum distance and vice versa, which can be seen by examining Fig. 1, for when the upper chamber therein rotates into the position of the lower chamber, the relative distances of its ends with respect to axis CL will have been reversed. This means that the liquid lodged in the outermost end must have been drawn inwardly against centrifugal force, thereby setting up a reaction which appears to provide a resistance to the torque or couple of the oscillator 21. After being drawn inwardly to a said position the liquid slides to the other end of the chamber as that other end recedes farther from the axis CL, due to the rotation about axis XY. This places the liquid at the opposite end of the chamber, from whence the drawing in action is repeated upon the next cycle. It may be said that the rotation about axis CL provides the centrifugal force for forcing the liquid to the farther ends of the chambers and the rotation about axis XY causes the relative change in positions of the chamber ends whereby the liquid is drawn inwardly to set up a resistance.

By free mass is to be understood herein a mass which is free to move back and forth in the chamber member 25, such as liquid material, comminuted solid material, or a single or a few solid masses freely movable in the inertia chamber. Freedom is not limited to movement in the chambers 37, but includes free movement in an annular or other chamber formed by peripherally or otherwise connecting the chambers 37 to form one chamber. This connected or single chamber form comprises another possible embodiment of the invention.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A transmission comprising a driving member, a driven member, a flexible inertia mass coupled to the driving member, said mass being adapted to move freely, an intermediate member adapted to be driven by the driving member to effect precessive movement of said mass, whereby a resistance is set up and means coupling the driving, intermediate and driven members whereby said resistance is effective to cause transmission of power.

2. A transmission comprising a driving member, a driven member aligned therewith on an axis, an intermediate member rotatable about said axis, said three members being connected by an epicyclic gear train for relative rotation, means coupled to the driving member, said means supporting a flexible inertia mass, said coupled means being borne on the intermediate member for a component of rotation about an axis angularly arranged to said first-named axes, said intermediate member providing another component or rotation about said first-named axes, whereby said inertia mass is caused to effect transmission of power by being intermittently drawn inwardly to said first-named axes.

3. A transmission comprising a driving member, a driven member, an intermediate member, said three members being connected for relative rotation, a chamber member coupled to the driving member and angularly borne on the intermediate member for rotation about an axis angular to the axis of the driving member, at least one chamber in said chamber member, a free mass in said chamber and said free mass not filling the chamber completely.

4. A transmission comprising a driving member, a driven member, an intermediate member, an epicyclic train connecting the driving, driven and intermediate members, said three members having relative rotation, a chamber member coupled to the driving member for universal movement and angularly borne on the intermediate member for rotative movement about an axis angular to the axis of the driving member, at least one chamber in said chamber member having a a free mass therein which fractionally fills said chamber.

In testimony whereof, I have signed my name to this specification this 12th day of March, 1928.

OSCAR JANSSEN.